(12) United States Patent
Tachibana et al.

(10) Patent No.: US 9,964,700 B2
(45) Date of Patent: May 8, 2018

(54) OPTICAL FIBER CORE AND OPTICAL FIBER TAPE CORE

(71) Applicant: SUMITOMO ELECTRIC INDUSTRIES, LTD., Osaka-shi, Osaka (JP)

(72) Inventors: Kumiko Tachibana, Kanagawa (JP); Takashi Fujii, Kanagawa (JP); Noriaki Iwaguchi, Kanagawa (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days. days.

(21) Appl. No.: 15/129,975

(22) PCT Filed: Dec. 2, 2015

(86) PCT No.: PCT/JP2015/083877
§ 371 (c)(1),
(2) Date: Sep. 28, 2016

(87) PCT Pub. No.: WO2016/088801
PCT Pub. Date: Jun. 9, 2016

(65) Prior Publication Data
US 2017/0184785 A1    Jun. 29, 2017

(30) Foreign Application Priority Data
Dec. 3, 2014  (JP) .................................. 2014-245075

(51) Int. Cl.
*G02B 6/036* (2006.01)
*G02B 6/02* (2006.01)
*C03C 25/10* (2018.01)

(52) U.S. Cl.
CPC ........ *G02B 6/02395* (2013.01); *C03C 25/102* (2013.01); *C03C 25/1065* (2013.01)

(58) Field of Classification Search
CPC .............. G02B 6/02395; C03C 25/102; C03C 25/1065
(Continued)

(56) References Cited

U.S. PATENT DOCUMENTS

2002/0051613 A1* 5/2002 Singh .................... C03C 25/226
                                                        385/128
2003/0210879 A1* 11/2003 Oshio ................ C08G 18/4854
                                                        385/128
(Continued)

FOREIGN PATENT DOCUMENTS

JP        H11-311723 A    11/1999
JP        2004-059420 A    2/2004
(Continued)

*Primary Examiner* — Jerry Blevins
(74) *Attorney, Agent, or Firm* — Drinker Biddle & Reath LLP

(57) ABSTRACT

An optical fiber comprises a glass fiber, and a coating resin layer with which the glass fiber is covered, the coating resin layer has a plurality of layers, the plurality of layers includes a first layer being in contact with the glass fiber, and a longest diameter at −40° C. of a void formed in the first layer is 100% or more and 300% or less of a longest diameter at 23° C. thereof, or a longest diameter at −40° C. of a void formed in the first layer is 100% or more and 600% or less of a longest diameter at 23° C. thereof, and a Young's modulus of the first layer is 0.3 MPa or less.

7 Claims, 3 Drawing Sheets

(58) Field of Classification Search
USPC .......................................................... 385/128
See application file for complete search history.

(56) References Cited

U.S. PATENT DOCUMENTS

2007/0104429 A1* 5/2007 Yokokawa ............ G02B 6/4434
385/112
2013/0315545 A1* 11/2013 Saito ........................ C03C 25/50
385/102

FOREIGN PATENT DOCUMENTS

| | | |
|---|---|---|
| JP | 2012-162415 A | 8/2012 |
| JP | 2013-167762 A | 8/2013 |
| JP | 2014-114208 A | 6/2014 |
| JP | 2014-118318 A | 6/2014 |
| WO | WO-02/051763 A1 | 7/2002 |
| WO | WO-02/066390 A1 | 8/2002 |
| WO | WO-2014/168201 A1 | 10/2014 |

* cited by examiner

OPTICAL FIBER CORE AND OPTICAL FIBER TAPE CORE

TECHNICAL FIELD

The present invention relates to an optical fiber and an optical fiber ribbon.

BACKGROUND ART

In general, an optical fiber has a protective coating layer for protecting a glass fiber. Patent Literature 1 describes an optical fiber including a primary coating layer and a secondary coating layer with which a glass fiber is covered. In the literature, the outer radius, the Young's modulus, the linear expansion coefficient and the Poisson's ratio of the primary coating layer are adjusted to thereby allow a void or cracking to occur in the primary coating layer, preventing the transmission loss of the optical fiber.

In addition, Patent Literature 2 describes a colored optical fiber having two coating layers: a primary coating layer and a secondary coating layer; in which any of the primary coating layer and the secondary coating layer is colored in order that both of microbend resistance and hot water resistance are satisfied.

CITATION LIST

Patent Literature

[Patent Literature 1] JP 2004-59420 A
[Patent Literature 2] JP 2013-167762 A

SUMMARY OF INVENTION

Technical Problem

On the other hand, the transmission loss tends to be increased at a low temperature where the coating layer of the glass fiber shrinks, and therefore the optical fiber is demanded to be reduced in the transmission loss due to the change of an environment such as a temperature.

An object of the present invention is then to provide an optical fiber in which an increase in transmission loss under a low temperature environment is reduced.

Solution to Problem

In order to solve the above problem, an optical fiber according to one embodiment comprises a glass fiber, and a coating resin layer with which the glass fiber is covered, the coating resin layer has a plurality of layers, the plurality of layers includes a first layer being in contact with the glass fiber, and a longest diameter at −40° C. of a void formed in the first layer is 100% or more and 300% or less of a longest diameter at 23° C. thereof.

In addition, in order to solve the above problem, an optical fiber according to one embodiment comprises a glass fiber, and a coating resin layer with which the glass fiber is covered, the coating resin layer has a plurality of layers, the plurality of layers includes a first layer being in contact with the glass fiber, a longest diameter at −40° C. of a void formed in the first layer is 100% or more and 600% or less of a longest diameter at 23° C. thereof, and a Young's modulus of the first layer is 0.3 MPa or less.

Advantageous Effects of Invention

According to the present invention, it is possible to provide an optical fiber and an optical fiber ribbon having a coating resin layer in which an increase in transmission loss under a low temperature environment is reduced.

DESCRIPTION OF EMBODIMENTS

Figure 1:
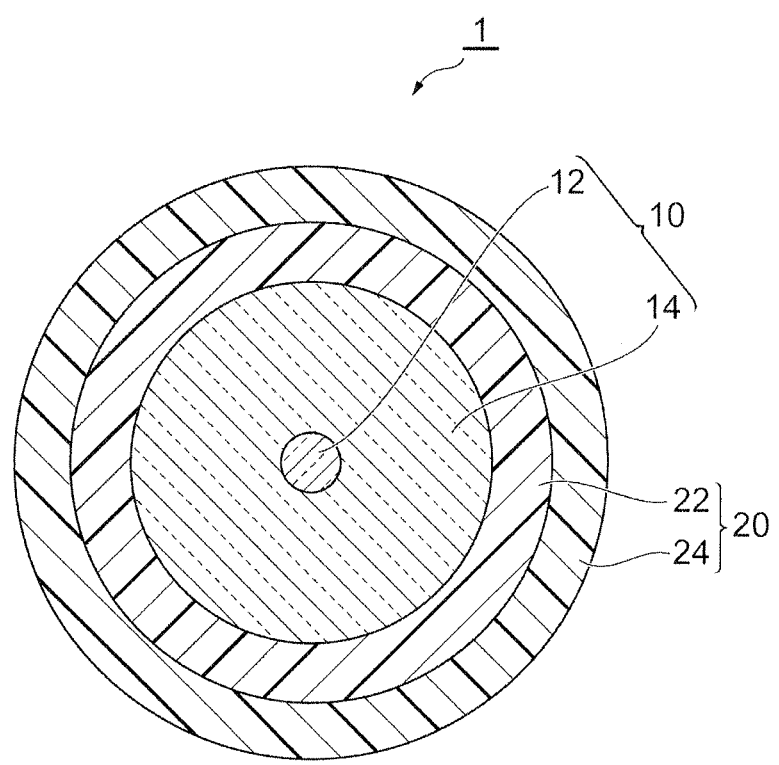
FIG. 1 is a cross-sectional view illustrating one example of an optical fiber according to the present embodiment.

Description of Embodiments of the Present Invention

First, the content of embodiments of the present invention is recited and described. An optical fiber according to one embodiment of the present invention comprises a glass fiber, and a coating resin layer with which the glass fiber is covered, the coating resin layer has a plurality of layers, the plurality of layers includes a first layer being in contact with the glass fiber, and a longest diameter at −40° C. of a void formed in the first layer is 100% or more and 300% or less of a longest diameter at 23° C. thereof.

In the optical fiber of the present embodiment, expansion of the void formed in the first layer is suppressed even at a low temperature of −40° C., and thus an increase in transmission loss under a low temperature environment can be reduced.

In the optical fiber, the Young's modulus of the first layer may be 0.8 MPa or less at room temperature. Thus, microbending loss is easily decreased.

From the viewpoint of reducing an increase in transmission loss under a low temperature environment, the increment of the transmission loss at −40° C. relative to the transmission loss at 23° C. in the optical fiber may be 0.05 dB/km or less.

The coating resin layer may have a colored layer of a thickness of 10 μm or more. Thus, colored layer peeling from an optical fiber ribbon can be prevented. A colored layer is prevented from peeling from an optical fiber when a ribbon layer is peeled from the optical fiber ribbon.

The coating resin layer may contain a titanium (Ti) element. Thus, a reduction in the degree of curing of the coating resin layer can be prevented.

The coating resin layer may include two layers, the first layer and a second layer in contact with the first layer, and the second layer may be colored. Thus, the optical fiber is easily distinguished.

In an aspect, the optical fiber of the present embodiment can be also an optical fiber comprising a glass fiber, and a coating resin layer with which the glass fiber is covered, the coating resin layer has a plurality of layers, the plurality of layers includes a first layer being in contact with the glass fiber, a longest diameter at −40° C. of a void formed in the first layer is 100% or more and 600% or less of a longest diameter at 23° C. thereof, and the Young's modulus of the first layer is 0.3 MPa or less.

In an optical fiber ribbon according to one embodiment of the present invention, a plurality of the optical fibers are in parallel and covered with a ribbon material. The optical fiber of the present embodiment is used, and therefore, an increase in transmission loss under a low temperature environment can be suppressed. In addition, no colored layer peeling occurs in an operation for removal of the ribbon material from the optical fiber ribbon and taking out of the optical fiber.

Detail of Embodiments of the Present Invention

Specific examples of an optical fiber according to an embodiment of the present invention and a production method thereof are described below with reference to the drawings. It is herein intended that the present invention is not limited to such examples, is represented by the claims, and encompasses all modifications within the meaning and the scope equivalent to the claims. In the following description, the same element is represented by the same symbol in the description of the drawings, and overlapping description is omitted.

(Fiber)

FIG. 1 is a cross-sectional view illustrating one example of an optical fiber 1 according to the present embodiment. As illustrated in FIG. 1, the optical fiber 1 of the present embodiment comprises a glass fiber 10 that is an optical transmitter and a coating resin layer 20.

The glass fiber 10 has a core 12 and a cladding 14, and includes a glass member, for example, $SiO_2$ glass. The glass fiber 10 transmits light introduced to the optical fiber 1. The core 12 is provided in, for example, a region including the center axial line of the glass fiber 10. The core 12 includes pure $SiO_2$ glass, or may additionally include $GeO_2$, a fluorine element, and the like. The cladding 14 is provided in a region surrounding the core 12. The cladding 14 has a refractive index lower than the refractive index of the core 12. The cladding 14 may include pure $SiO_2$ glass, or may include $SiO_2$ glass to which a fluorine element is added.

The diameter of the glass fiber 10 is usually about 125 μm. The total thickness of the coating resin layer 20 is usually 60 to 70 μm, preferably 70 μm or less, more preferably 65 μm. The outer diameter of the optical fiber 1 is 245 to 265 μm, preferably 255 μm.

The coating resin layer 20 is configured from a plurality of layers, and has at least the first layer 22 in contact with the glass fiber and the second layer 24 in contact with the first layer 22. For example, when the coating resin layer 20 includes two layers, the coating resin layer 20 is configured from a primary resin layer as the first layer 22 and a secondary resin layer as the second layer 24, as illustrated in FIG. 1. Herein, the number of layers in the coating resin layer 20 is not limited to 2, and a third layer as an ink layer may also be further formed on the outer periphery surface of the second layer 24.

It is preferable that the coating resin layer 20 have a colored layer of a thickness of 10 μm or more. When the coating resin layer 20 includes the first layer 22 and the second layer 24, at least one layer may be the colored layer, and it is preferable that the second layer 24 be colored from the viewpoint of an enhancement in distinguishability of the optical fiber 1.

The thickness of the colored layer is 10 μm or more, preferably 10 to 70 μm, more preferably 10 to 50 μm, and is further preferably 20 to 40 μm in terms of mechanical strength of the optical fiber 1. When the thickness of the colored layer is 10 μm or more, it is possible to suppress color peeling.

The thickness of the first layer 22 is usually about 20 to 50 μm, and when the first layer 22 is the colored layer, the thickness of the first layer 22 is the thickness of the colored layer. The thickness of the second layer 24 is usually about 20 to 40 μm, and when the second layer 24 is the colored layer, the thickness of the second layer 24 is the thickness of the colored layer.

The coating resin layer 20 can be formed by, for example, curing an ultraviolet curable resin composition including an oligomer, a monomer and a photopolymerization initiator.

Examples of the oligomer include urethane (meth)acrylates and epoxy (meth)acrylates. The oligomer can be used as a mixture of two or more.

The urethane (meth)acrylates include those obtained by reacting a polyol compound, a polyisocyanate compound and a hydroxyl group-containing acrylate compound. Examples of the polyol compound include polytetramethylene glycol, polypropylene glycol and bisphenol A-ethylene oxide adduct diol. The polyisocyanate compound include 2,4-tolylene diisocyanate, 2,6-tolylene diisocyanate and isophorone diisocyanate. Examples of the hydroxyl group-containing acrylate compound include 2-hydroxy (meth)acrylate, 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth) acrylate and tripropylene glycol di(meth)acrylate. As the epoxy (meth)acrylate, for example, one obtained by reacting an epoxy compound and (meth)acrylic acid can be used.

The (meth)acrylate here means acrylate, or methacrylate corresponding thereto. Much the same is true on (meth) acrylic acid.

The content of the oligomer is preferably 50 to 90% by mass, more preferably 35 to 85% by mass based on the total amount of the ultraviolet curable resin composition.

As the monomer, a monofunctional monomer having one polymerizable group or a polyfunctional monomer having two or more polymerizable groups can be used.

The monofunctional monomer include N-vinyl monomers having a cyclic structure, such as N-vinylpyrrolidone, N-vinylcaprolactam and (meth)acryloylmorpholine; and (meth) acrylate compounds such as isobornyl (meth)acrylate, tricyclodecanyl (meth)acrylate, benzyl (meth)acrylate, dicyclopentanyl (meth)acrylate, 2-hydroxyethyl (meth)acrylate, nonylphenyl (meth)acrylate, phenoxyethyl (meth)acrylate and polypropylene glycol mono(meth)acrylate. Among them, an N-vinyl monomer having a cyclic structure is preferable from the viewpoint of an enhancement in curing speed.

The polyfunctional monomer include polyethylene glycol di(meth)acrylate, tricyclodecanediyl dimethylene di(meth) acrylate, bisphenol A-ethylene oxide adduct diol di(meth) acrylate, trimethylolpropane tri(meth)acrylate, and the like.

The monomer can be used as a mixture of two or more. The content of the monomer is preferably 5 to 45% by mass, more preferably 10 to 30% by mass based on the total amount of the ultraviolet curable resin composition.

The photopolymerization initiator can be appropriately selected from known radical photopolymerization initiators, and used, and examples include an acyl phosphine oxide type initiator and an acetophenone type initiator.

The acyl phosphine oxide type initiator include 2,4,6-trimethylbenzoyl diphenylphosphine oxide (produced by BASF SE, trade name "Lucirin TPO"), 2,4,4-trimethylpentyl phosphine oxide, 2,4,4-trimethylbenzoyl diphenylphosphinoxide, and the like.

The acetophenone type initiator include 1-hydroxycyclohexan-1-yl phenyl ketone (produced by BASF SE, trade name "Irgacure 184"), 2-hydroxy-2-methyl-1-phenyl-propan-1-one (produced by BASF SE, trade name "Darocure 1173"), 2,2-dimethoxy-1,2-diphenylethan-1-one (produced by BASF SE, trade name "Irgacure 651"), 2-methyl-1-(4- methylthiophenyl)-2-morpholinopropan-1-one (produced by BASF SE, trade name "Irgacure 907"), 2-benzyl-2-di methyl amino-1-(4-morpholinophenyl)-butanone-1 (produced by BASF SE, trade name "Irgacure 369"), 1-hydroxycyclohexyl phenyl ketone, 2,2-dimethoxy-2-phenylacetophenone, 1-(4-isopropylphenyl)-2-hydroxy-2-methylpropan-1-one, and the like.

The photopolymerization initiator can be used as a mixture of two or more. The content of the photopolymerization initiator is preferably 0.1 to 10% by mass, more preferably 0.3 to 7% by mass based on the total amount of the ultraviolet curable resin composition.

It is preferable that the coating resin layer contain a titanium element, and it is more preferable that a resin layer serving as the colored layer contain titanium oxide. An ultraviolet curable resin composition containing titanium oxide can be used to thereby form a colored layer high in the degree of curing by ultraviolet irradiation, and easily suppress the change in color of the colored layer over time. Moreover, a reduction in the degree of curing of the colored layer can also be prevented to thereby enhance hot water resistance of the optical fiber ribbon. The reason for this is considered because titanium oxide in the resin layer scatters ultraviolet light. The amount of the Ti element in the coating resin layer is preferably 0.06 to 1.8% by mass, more preferably 0.12 to 0.90% by mass. It is preferable to be compounded so that the amount of titanium oxide to be added to the coating resin layer is 0.1 to 3% by mass, more preferably 0.2 to 1.5% by mass based on the sum amount of the coating resin layer 20. The content of the titanium element in the coating resin layer can be determined by high-frequency inductively coupled plasma (ICP) measurement.

It is preferable that the colored layer contain a pigment from the viewpoint of an enhancement in distinguishability of the optical fiber. The pigment include coloring pigments such as carbon black, titanium oxide and zinc flower, magnetic powders such as $\gamma$-$Fe_2O_3$, a mixed crystal of $\gamma$-$Fe_2O_3$ and $\gamma$-$Fe_3O_4$, $CrO_2$, cobalt ferrite, iron oxide to which cobalt adheres, barium ferrite, Fe—Co and Fe—Co—Ni, and inorganic pigments such as MIO, zinc chromate, strontium chromate, aluminum tripolyphosphate, zinc, alumina, glass and mica. In addition, an organic pigment such as an azo type pigment, a phthalocyanine type pigment, or a dyeing lake pigment can also be used. The pigment may be subjected to various treatments such as surface modification and formation of a composite pigment. The pigment may be preferably added so as to be included in an amount of 0.1 to 5% by mass, more preferably 0.12 to 3.2% by mass, based on the sum amount of the coating resin layer 20. It is preferable that the pigment be included in an amount of 0.12 to 0.99% by mass based on the sum amount of the coating resin layer 20 from the viewpoint of an improvement in curability of the coating resin layer 20.

As the method of forming the coating resin layer 20 on the glass fiber 10, a method that has been conventionally used for production of an optical fiber can be applied.

For example, the coating resin layer 20 is formed by coating the cladding 14 with a curable resin composition, and curing the curable resin composition by irradiation with ultraviolet light.

When the coating resin layer 20 has the first layer 22 and the second layer 24, a system (wet-on-dry system) may be used in which the cladding 14 is coated with a curable resin composition for first layer formation, the composition is cured by irradiation with ultraviolet light to form the first layer 22, and thereafter the first layer 22 is coated with a curable resin composition for second layer formation and the composition is cured by irradiation with ultraviolet light to form the second layer 24. Alternatively, a system (wet-on-wet system) may be used in which the cladding 14 is coated with a curable resin composition for first layer formation and thereafter coated with a curable resin composition for second layer formation, and the compositions are simultaneously cured by irradiation with ultraviolet light to form the first layer 22 and the second layer 24.

The Young's modulus of the first layer 22 is preferably 1 MPa or less, more preferably 0.8 MPa or less, further preferably 0.4 MPa or less at room temperature. The lower limit of the Young's modulus of the first layer 22 is not particularly limited, and is about 0.05 MPa. The Young's modulus of the second layer 24 is preferably 500 to 1000 MPa, more preferably 700 to 900 MPa. In the present description, the room temperature here refers to 23° C.

A combination example of the Young's modulus of the first layer and the Young's modulus of the second layer can be any of various combinations of the Young's modulus of the first layer and the Young's modulus of the second layer within the following ranges: the first layer is 0.05 MPa and the second layer is 1000 MPa, the first layer is 1 MPa and the second layer is 500 MPa, the first layer is 0.1 MPa and the second layer is 900 MPa, the first layer is 0.2 MPa and the second layer is 800 MPa, the first layer is 0.3 MPa and the second layer is 700 MPa, and the like.

The ratio of the longest diameter at −40° C. to the longest diameter at 23° C. of a void formed in the first layer of the optical fiber of the present embodiment varies depending on the optical fiber because of varying depending on the composition of the resin, production conditions (the amount of ultraviolet irradiation, the temperature in curing, the tensile force in fiber drawing, and the like), storage conditions, and the like. The longest diameter ratio of a void varies depending on the production history and storage conditions even in the case of the same resin, and cannot be put otherwise only by the resin composition.

The longest diameter at −40° C. of a void present (formed) in the first layer of the optical fiber 1 of the present embodiment is 100% or more and 300% or less of the longest diameter at 23° C. thereof, and is more preferably 100 to 250% from the viewpoint of further reducing an increase in transmission loss under a low temperature environment.

In addition, when the Young's modulus of the first layer is 0.3 MPa or less in the optical fiber 1 of the present embodiment, an increase in transmission loss under a low temperature environment can be reduced even if the longest diameter at −40° C. of a void formed in the first layer is 100% or more and 600% or less of the longest diameter at 23° C. thereof.

(Optical Fiber Ribbon)

Figure 2:
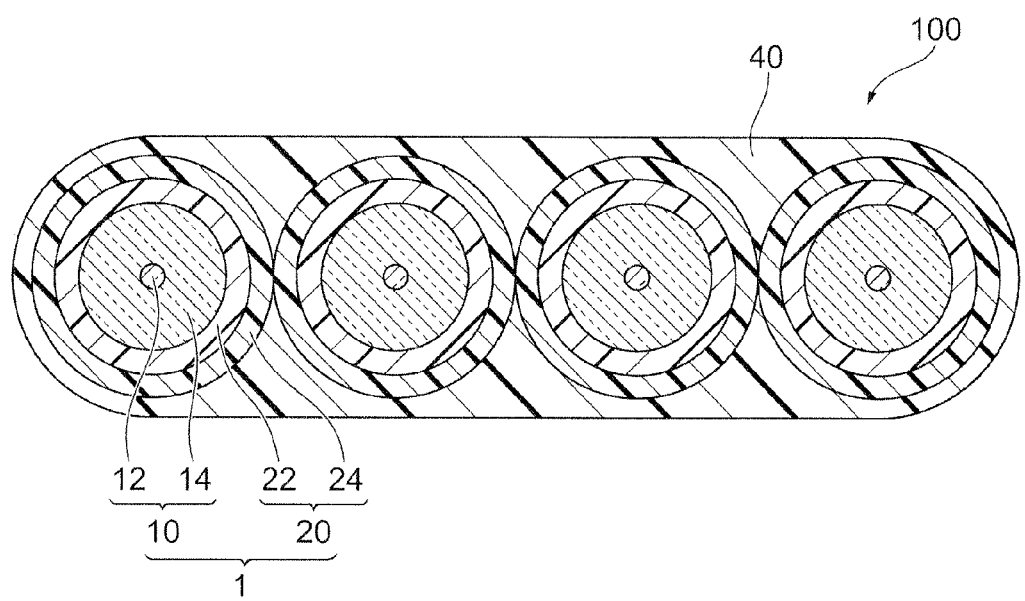
FIG. 2 is a cross-sectional view illustrating one example of an optical fiber ribbon according to the present embodiment.

The optical fiber of the present embodiment can be used to produce an optical fiber ribbon. FIG. 2 is a cross-sectional view of an optical fiber ribbon 100 according to the present embodiment. The optical fiber ribbon 100 illustrated in the same figure is one in which a plurality of (4 in the case) the optical fiber 1 are arranged in parallel and integrated by a ribbon material 40. The ribbon material 40 is formed by, for example, an epoxy acrylate resin, a urethane acrylate resin or the like. Such an optical fiber ribbon can allow an increase in transmission loss under a low temperature environment to be reduced. In addition, the optical fiber ribbon can allow the optical fiber to be easily distinguished in an operation for removal of the ribbon material from the optical fiber ribbon and takeoff of the optical fiber, without the occurrence of any color peeling.

EXAMPLES

Next, the present invention is described in detail with reference to Examples, but the present invention is not limited to these Examples.

[Preparation of Resin Composition]
(Oligomer)

Polypropylene glycol having a number average molecular weight of 3000 was allowed to react with 2,4-tolylene diisocyanate and 2-hydroxyethyl acrylate, to thereby prepare each urethane acrylate oligomer shown in Table 1.

TABLE 1

| Urethane acrylate oligomer | a | b | c |
|---|---|---|---|
| One-terminal non-reactive oligomer (% by mass) | 20 | 40 | 100 |
| Both-terminal reactive oligomer (% by mass) | 80 | 60 | 0 |

The one-terminal non-reactive oligomer has a structure represented by "H-T-polypropylene glycol-T-MeOH", and the both-terminal reactive oligomer has a structure represented by "H-T-polypropylene glycol-T-H". In designation of the oligomers, "H" represents a 2-hydroxyethyl acrylate residue, "T" represents a 2,4-tolylene diisocyanate residue, "MeOH" represents a methanol residue, and "polypropylene glycol" represents a polypropylene glycol residue.

Preparation Example 1

Mixed were 75 parts by mass of urethane acrylate oligomer a as an oligomer, 10 parts by mass of N-vinylcaprolactam as a monomer, 3 parts by mass of 2,4,6-trimethylbenzoyl diphenylphosphine oxide (Lucirin TPO) as a photopolymerization initiator and 1 part by mass of a silane coupling agent, to prepare resin composition A1.

Preparation Example 2

Resin composition A2 was prepared in the same manner as in Preparation Example 1 except that the oligomer was changed to urethane acrylate oligomer b.

Preparation Example 3

Resin composition A3 was prepared in the same manner as in Preparation Example 1 except that the oligomer was changed to urethane acrylate oligomer c.

Preparation Example 4

Mixed were 50 parts by mass of a urethane acrylate oligomer obtained by reacting 2,4-tolylene diisocyanate and 2-hydroxyethyl acrylate with polypropylene glycol having a number average molecular weight of 1000, as an oligomer, 25 parts by mass of epoxy diacrylate and 15 parts by mass of 2-ethylhexyl acrylate as monomers, and 3 parts by mass of I-hydroxycyclohexan-1-yl phenyl ketone (Irgacure 184) as a photopolymerization initiator, to prepare resin composition B.

Preparation Example 5

Copper phthalocyanine as a colorant was mixed with resin composition B above so that the amount thereof was 0.2% by mass based on the sum amount of the coating resin layer, to prepare resin composition C.

Preparation Example 6

Copper phthalocyanine and titanium oxide as colorants were mixed with resin composition B above so that the amounts thereof were 0.2% by mass and 0.9% by mass based on the sum amount of the coating resin layer, respectively, to prepare resin composition D.

[Optical Fiber]

Example 1

A first layer (primary resin layer) having a thickness of 35 µm was formed on the outer periphery of a glass fiber having a diameter of 125 µm, the fiber being configured from a core and a cladding, by use of resin composition A1, and a second layer (secondary resin layer) having a thickness of 25 µm was further formed on the outer periphery of the resultant by use of resin composition B, to obtain an optical fiber having a diameter of 245 µm. The linear velocity was 1000 m/min.

Example 2

An optical fiber was produced by the same operation as in Example 1 except that the first layer was formed by use of resin composition A2.

Example 3

An optical fiber was produced by the same operation as in Example 1 except that the first layer was formed by use of resin composition A3 and the linear velocity was 500 m/min.

Example 4

An optical fiber was produced by the same operation as in Example 1 except that the first layer was formed by use of resin composition A3.

Example 5

An optical fiber was produced by the same operation as in Example 1 except that the linear velocity was 500 m/min.

Example 6

A first layer (primary resin layer) having a thickness of 35 µm was formed on a glass fiber having a diameter of 125 µm, the fiber being configured from a core and a cladding, by use of resin composition A1, and a second layer (secondary resin layer) having a thickness of 25 µm was further formed on the circumference of the resultant by use of resin composition B. The linear velocity was 1000 m/min. This was wound up once, and thereafter, while the optical fiber was anew unwound, an ink layer (colored layer) having a thickness of 5 µm was formed on the outer periphery of the second layer by use of resin composition C in a coloring machine, to thereby produce an optical fiber having a diameter of 255 µm.

Example 7

An optical fiber was produced by the same operation as in Example 1 except that a first layer (primary resin layer) having a thickness of 55 µm was formed by use of resin composition A1 and a second layer (colored layer) having a thickness of 10 μm was formed by use of resin composition D.

Example 8

An optical fiber was produced by the same operation as in Example 1 except that a first layer (primary resin layer) having a thickness of 55 μm was formed by use of resin composition A1 and a second layer (colored layer) having a thickness of 10 μm was formed by use of resin composition C.

Example 9

An optical fiber was produced by the same operation as in Example 1 except that the first layer was formed by use of resin composition A2 and the linear velocity was 2000 m/min.

Comparative Example 1

An optical fiber was produced by the same operation as in Example 1 except that the linear velocity was 2000 m/min.

[Evaluation of Optical Fiber]

Each of the optical fibers produced was evaluated as follows. The evaluation results are shown in Table 2.

(Amount of Titanium Element in Coating Resin)

10 ml of sulfuric acid and 5 ml of nitric acid were added to 0.2 g of the optical fiber (including 0.12 g of a coating resin), the resultant was warmed for 10 minutes after generation of white smoke, thereafter 1 ml of perchloric acid was added thereto and warmed until the insoluble fraction disappeared, and thereafter the amount of titanium (Ti) was measured by ICP.

(Young's Modulus)

The Young's modulus of the first layer of the optical fiber at room temperature (23° C.) was measured by the Pullout Modulus (POM) method. Two positions of the optical fiber were secured by two chuck devices, and a coating resin layer portion between the two chuck devices was removed. Next, one of the chuck devices was secured, and the other of the chuck devices was moderately moved towards the opposite direction of the chuck device secured. When the length of a portion of the optical fiber, the portion being sandwiched by the chuck device to be moved, was designated as L, the amount of movement of the chuck was designated as Z, the outer diameter of the first layer was designated as Dp, the outer diameter of the glass fiber was designated as Df, the Poisson's ratio of the first layer was designated as n and the load in movement of the chuck device was designated as W, the Young's modulus of the first layer (POM value) was determined from the following expression.

$$\text{Young's modulus (MPa)} = ((1+n)W/\pi LZ) \times \ln(Dp/Df)$$

(Change Rate of Void)

Figure 3:
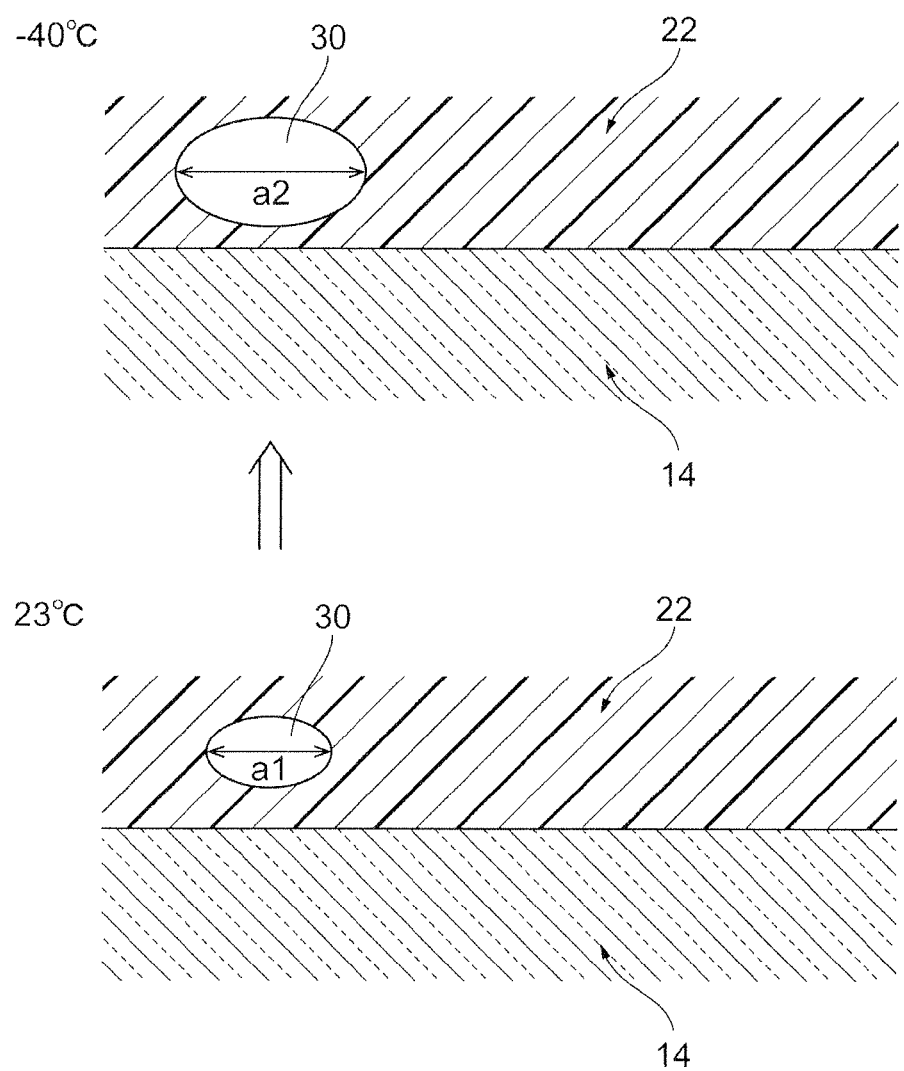
FIG. 3 is a schematic view for describing a void present in a first layer.

The optical fiber was rubbed by a roller while a weight being adjusted, and a void was formed in the first layer so that the longest diameter of the void at 23° C. was about 5 μm. The optical fiber was immersed in a matching oil, and the side surface of the optical fiber was observed by use of a microscope and a temperature-controllable stage. FIG. 3 is a schematic view for describing a void 30 present in the first layer 22. First, the longest diameter a1 of the void 30 was measured at a stage temperature of 23° C. Next, the stage temperature was changed to −40° C. and left for 2 hours after reaching −40° C., and thereafter the longest diameter a2 of the void 30 was again measured to determine the change rate from the following expression.

Change rate (%)=(void longest diameter at −40° C.)/(void longest diameter at 23° C.)×100

(Increase in Low-Temperature Loss)

The transmission loss of the optical fiber to which a screening tension of 2 kg was applied was measured at 23° C., thereafter the same optical fiber was left to stand at −40° C. for 2 hours, and the transmission loss was measured. The increase in transmission loss of light at a wavelength of 1550 nm, of the optical fiber after left to stand at −40° C., was determined as compared with that before left to stand at −40° C. In Table 2, a case where the increase in transmission loss was more than 0.05 dB/km was rated as "B", and a case where the increase was 0.05 dB/km or less was rated as "A".

(Microbending Loss)

An optical fiber to be tested was wound, in a single layer manner, on each of a bobbin which had a diameter of 280 mm and whose surface was covered with sandpaper and a bobbin which had the same diameter and whose surface was not covered with sandpaper, and the transmission loss of light at a wavelength of 1550 nm was measured by the OTDR (Optical Time Domain Reflectometer) method. As the optical fiber to be tested, used was a single mode optical fiber according to G652, the fiber having a MFD1 (mode field diameter) of 10.4 μm. The loss measured was used to calculate the Δα by the following expression. In Table 2, a case where the Δα was 0.3 dB/km or more was rated as "A", a case where the Δα was more than 0.3 dB/km and 0.5 dB/km or less was rated as "B", and a case where the Δα was more than 0.5 dB/km was rated as "C".

Δα (dB/km)=loss (with sandpaper)−loss (without sandpaper)

[Optical Fiber Ribbon]

Four of the optical fibers were prepared to produce an optical fiber ribbon illustrated in FIG. 2.

As the ribbon material of the optical fiber ribbon, a resin composition was used in which 18 parts by mass of urethane acrylate obtained by reacting 1 mol of bisphenol A-ethylene oxide adduct diol, 2 mol of tolylene diisocyanate and 2 mol of hydroxyethyl acrylate, 10 parts by mass of urethane acrylate obtained by reacting 1 mol of polytetramethylene glycol, 2 mol of tolylene diisocyanate and 2 mol of hydroxyethyl acrylate, 15 parts by mass of tricyclodecane diacrylate obtained by reacting 1 mol of tolylene diisocyanate and 2 mol of hydroxyethyl acrylate, 10 parts by mass of N-vinylpyrrolidone, 10 parts by mass of isobornyl acrylate, 5 parts by mass of bisphenol A-ethylene oxide adduct diol diacrylate, 0.7 parts by mass of 2-methyl-1-[4-(methylthio)phenyl]-2-morpholino-propan-1-one (Irgacure 907 produced by Chiba Speciality Chemicals Co. Ltd.), and 1.3 parts by mass of 2,4,6-trimethylbenzoyldiphenyl phosphine oxide (Lucirin TPO, produced by BASF SE) were mixed.

(Increase in Hot Water Loss)

The optical fiber ribbon was immersed in hot water at 60° C. for 30 days, and the transmission loss at a wavelength of 1.55 μm was measured before the immersion and at 30 days after the immersion by the OTDR method. The loss level measured was used to calculate the increase in hot water loss (Δα) by the following expression. In Table 2, a case where the Δα was 0.05 dB/km or less was rated as "A", and a case where the Δα was more than 0.05 dB/km was rated as "B".

Δα (dB/km)=loss (after immersion in hot water at 60° C. for 30 days)−loss (before immersion)

(Color Peeling)

The optical fiber ribbon was degraded under an environment of 85° C./85% RH (dark place) for 30 days, and thereafter the optical fiber was taken by single fiber separation from the optical fiber ribbon according to Telcordia GR-20 5.3.1. The presence of peeling of the colored layer or the ink layer here was evaluated. In Table 2, a case where no peeing was observed was rated as "A", and a case where peeing was observed was rated as "B". Those having no colored layer were not subjects.

TABLE 2

|  | Example | | | | | | | | | Comparative Example |
|---|---|---|---|---|---|---|---|---|---|---|
|  | 1 | 2 | 3 | 4 | 5 | 6 | 7 | 8 | 9 | 1 |
| The number of layers in coating resin layer | 2 | 2 | 2 | 2 | 2 | 3 | 2 | 2 | 2 | 2 |
| Thickness of colored layer (μm) | — | — | — | — | — | 5 | 10 | 10 | — | — |
| Amount of titanium (% by mass) | 0 | 0 | 0 | 0 | 0 | 0 | 0.9 | 0 | 0 | 0 |
| Resin composition of first layer | A1 | A2 | A3 | A3 | A1 | A1 | A1 | A1 | A2 | A1 |
| Linear velocity (m/min) | 1000 | 1000 | 500 | 1000 | 500 | 1000 | 1000 | 1000 | 2000 | 2000 |
| Young's modulus of first layer (MPa) | 0.8 | 0.6 | 0.15 | 0.05 | 1.0 | 0.8 | 0.8 | 0.6 | 0.3 | 0.5 |
| Change rate of void (%) | 110 | 150 | 250 | 300 | 100 | 110 | 120 | 200 | 600 | 350 |
| Increase in low-temperature loss | A | A | A | A | A | A | A | A | A | B |
| Microbending loss | B | B | A | A | C | B | B | B | B | B |
| Increase in hot water loss | A | A | A | A | A | B | A | B | A | B |
| Color peeling | — | — | — | — | — | B | A | A | — | — |

All the optical fibers produced in Examples could be confirmed to be small in the increase in transmission loss under a low temperature environment. On the contrary, the change rate of the void longest diameter was more than 300% in Comparative Example 1, and the increase in low-temperature loss was rated "B" and was relatively large. Here, the reason why the microbending loss was rated as "C" in Example 5 was considered because the Young's modulus of the first layer was as relatively high as 1.0 MPa. In Example 1 where the Young's modulus of the first layer was 0.8 MPa, the microbending loss was rated as "B" and was improved.

REFERENCE SIGNS LIST

1: optical fiber, 10: glass fiber, 12: core, 14: cladding, 20: coating resin layer, 22: first layer, 24: second layer, 30: void, 40: ribbon material, and 100: optical fiber ribbon.

The invention claimed is:

1. An optical fiber comprising a glass fiber and a coating resin layer with which the glass fiber is covered;
   the coating resin layer having a plurality of layers;
   the plurality of layers including a first layer being in contact with the glass fiber, wherein a longest diameter at −40° C. of a void formed in the first layer is 100% or more and 300% or less of a longest diameter at 23° C. thereof; and
   the plurality of layers including a second layer in contact with the first layer, and the second layer containing a titanium element,
   wherein an increment of a transmission loss at −40° C. relative to a transmission loss at 23° C. is 0.05 dB/km or less.

2. The optical fiber according to claim 1, wherein a Young's modulus of the first layer is 0.8 MPa or less at room temperature.

3. The optical fiber according to claim 1, wherein the second layer is colored.

4. An optical fiber ribbon in which a plurality of the optical fibers according to claim 3 are in parallel and covered with a ribbon material.

5. An optical fiber comprising a glass fiber and a coating resin layer with which the glass fiber is covered;
   the coating resin layer having a plurality of layers;
   the plurality of layers including a first layer being in contact with the glass fiber, wherein a longest diameter at −40° C. of a void formed in the first layer is 100% or more and 600% or less of a longest diameter at 23° C. thereof, and a Young's modulus of the first layer is 0.3 MPa or less; and the plurality of layers including a second layer in contact with the first layer, and the second layer containing a titanium element,
wherein an increment of a transmission loss at −40° C. relative to a transmission loss at 23° C. is 0.05 dB/km or less.

6. The optical fiber according to claim 5, wherein the second layer is colored.

7. An optical fiber ribbon in which a plurality of the optical fibers according to claim 6 are in parallel and covered with a ribbon material.

* * * * *